3,204,010
DEFLUORINATION PROCESS
Joe Van Pool, Bartlesville, Okla., assignor to Phillips Petroleum Company, a corporation of Delaware
Filed Dec. 18, 1961, Ser. No. 160,069
11 Claims. (Cl. 260—683.42)

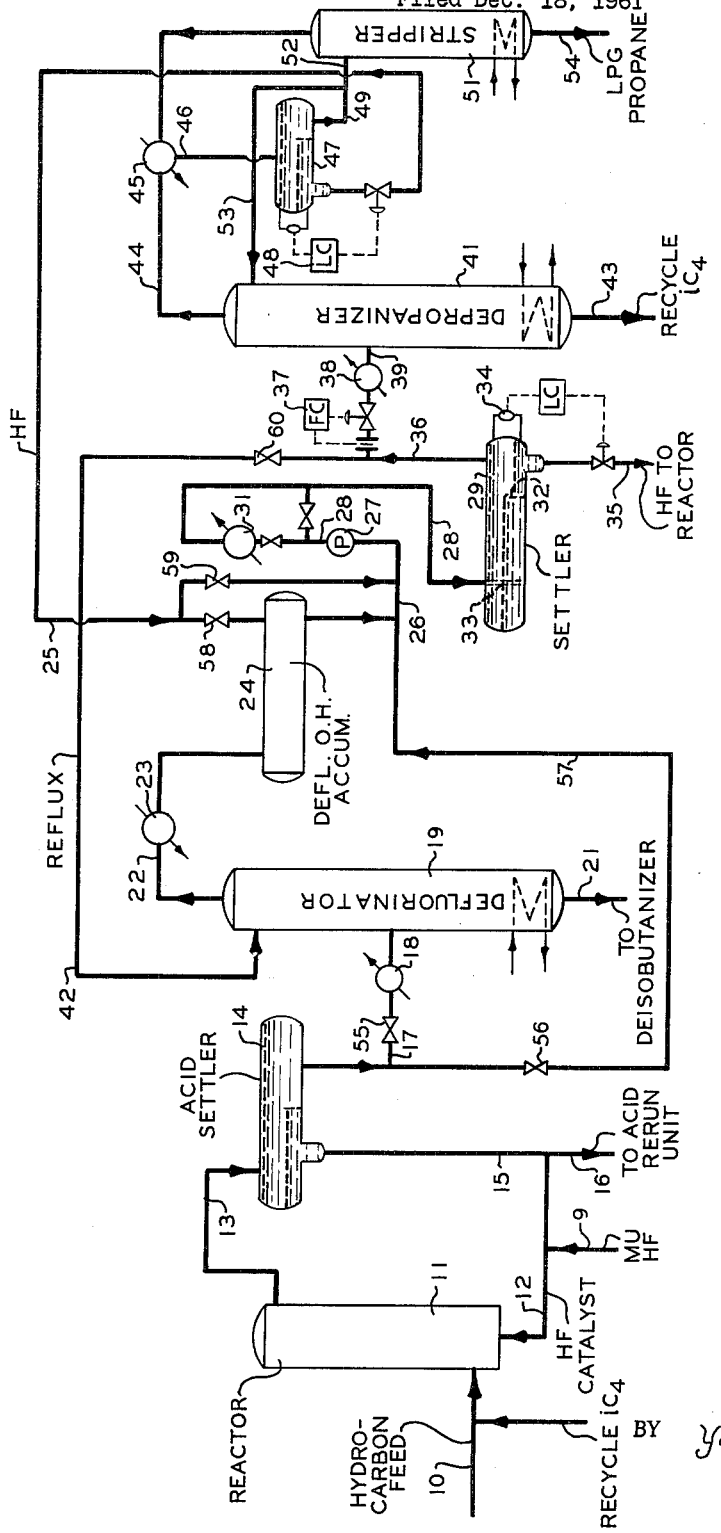

This invention relates to processes for treating organic compounds with hydrogen fluoride (HF). In one aspect it relates to the removal of organic fluorides from materials containing same. In a more specific aspect it relates to an improved process for the removal of alkyl fluorides from a low-boiling hydrocarbon such as propane.

In the manufacture of hydrocarbons by processes wherein fluorine-containing catalysts, such as hydrogen fluoride and boron trifluoride, are used, small proportions of organic fluorine-containing by-products are formed. Such processes can involve such reactions as isomerization, polymerization, alkylation, and disproportionation of relatively low-boiling hydrocarbons. Such processes are well known. One class of by-products which is formed and which must be removed from the products is believed to comprise alkyl fluorides.

In those processes wherein low-boiling hydrocarbons such as propane and lighter are formed, the presence of alkyl fluoride is not particularly objectionable for some end uses of the hydrocarbons; however, for other end uses it is essential that the hydrocarbon be substantially free of fluorine compounds such as boron trifluoride, hydrogen fluoride, and organic fluorides.

In the treatment of hydrocarbons with a fluorine-containing catalyst such as hydrogen fluoride (HF), the reaction products are usually separated into fractions by distillation steps and the hydrogen fluoride is ordinarily removed overhead in the first distillation step and when the overhead product is cooled a phase separation occurs with liquid HF forming the lower phase and liquid hydrocarbon forming the upper phase. The liquid hydrocarbon phase will be saturated with HF and will also contain organic fluorides such as low-boiling alkyl fluorides. The feed to such distillation step is saturated with HF but contains no free liquid HF since it is common practice to effect a phase separation of the effluent from the reactor and to utilize the liquid hydrocarbon phase as the feed to the distillation step.

It has been proposed to return a portion of the liquid HF obtained from the overhead product of the distillation step to the distillation step via the feed or via the reboiler section of the distillation step so as to decompose the low-boiling alkyl fluorides which are introduced into the distillation step with the feed. Such process has been successful in reducing the alkyl fluoride content of the low-boiling hydrocarbons to a very low value; however, such process has been accompanied by a severe corrosion problem in the fractionating column employed for the distillation step.

It is therefore a principal object of this invention to provide a method for removing fluoride compounds from materials without introducing a corrosion problem in the distillation of those materials. It is also an object to provide means for the decomposition of organic fluorides contained in a material prior to distillation of such material. Another object is to decompose low-boiling alkyl fluorides at a locus removed from a distillation step. Still another object is to provide a method and a means to prevent corrosion in the distillation equipment in a system wherein organic fluorides are decomposed. Other objects and advantages of the invention will be clear to one skilled in the art upon study of the disclosure including the description and the appended drawing wherein:

The sole figure is a schematic flow diagram illustrating a specific embodiment of the invention as applied to the treatment of hydrocarbons containing alkyl fluorides resulting from an alkylation process in the presence of hydrogen fluoride.

The process of the invention will now be described with reference to the drawing. It is to be understood that numerous items of equipment such as pumps, valves and the like have been omitted from the drawing so as to simplify the description of the invention. Those skilled in the art will realize that such conventional equipment can be employed as desired.

A suitable hydrocarbon charge, such as a mixture of isobutane, propylene and butene, is passed through conduit 10 to reactor 11 and a hydrogen fluoride catalyst is passed through conduit 12 and reactor 11. The effluent from the reactor is passed through conduit 13 to acid settler 14 wherein a separation is made between a liquid hydrocarbon phase and a liquid hydrofluoric acid phase. The hydrocarbon phase will be saturated with hydrogen fluoride (HF) and the HF phase will be saturated with hydrocarbon. The liquid HF phase is removed via conduit 15 and may be returned at least in part to reactor 11 via conduit 12. Generally it is desirable to pass a portion of the used catalyst to purification equipment, not shown, via conduit 16. Make-up HF is added via conduit 9 as required. The hydrocarbon phase is passed from settler 14 via conduit 17 and heater 18 to defluorinator 19 which is a fractional distillation zone which distills HF, propane and alkyl fluorides, boiling in the propane range, overhead along with some isobutane. The major portion of the isobutane along with the alkylate is removed via conduit 21 for further treatment.

The overhead stream from defluorinator 19 is passed via conduit 22 and cooler 23 to accumulator 24. The total liquid stream from accumulator 24 including recycle HF from conduit 25 is passed via conduit 26, pump 27 and conduit 28 to settler 29. If desired the stream can be heated in heater 31. A baffle 32 in settler 29 maintains a liquid level of HF and an extension 33 of conduit 28 dips into the liquid HF to encourage contact of the hydrocarbon stream containing alkyl fluorides with the liquid HF. Excess HF is withdrawn from settler 29 in response to liquid level controller 34 via conduit 35 and returned to reactor 11.

Hydrocarbon, containing dissolved HF but no free HF, is passed from settler 29 via conduit 36, flow controller 37, heater 38 and conduit 39 to depropanizer 41. A portion of the hydrocarbon stream in conduit 36 is passed via conduit 42 to defluorinator 19. The kettle product from depropanizer 41 comprising isobutane is passed via conduit 43 to reactor 11 as recycle. The overhead from depropanizer 41 is passed via conduit 44, cooler 45, and conduit 46 to accumulator 47. Liquid HF is withdrawn from accumulator 47 in response to liquid level controller 48 and is passed via conduit 25 to accumulator 24. The hydrocarbon phase is withdrawn from accumulator 47 via conduit 49, a first portion being passed to reflux stripper 51 via conduit 52 and a second portion being passed to reflux depropanizer 41 via conduit 53. Propane is withdrawn from stripper 51 via conduit 54. A stripping gas can be used in stripper 51 if desired.

As an alternative but less preferred embodiment of the invention, the defluorinator 19 and accumulator 24 can be bypassed by closing valve 55 and opening valve 56 so that the hydrocarbon stream from acid settler 14 passes via conduit 57 to conduit 26; and by closing valve 58 and opening valve 59 so that HF in conduit 25 passes to conduit 26. In this modification of the invention the stream in conduit 43 will be passed to a deisobutanizer (not shown).

When operating according to the prior art in a system such as that to which the invention is applied in the drawing, the hydrocarbon phase in defluorinator overhead accumulator 24 is passed directly to the depropanizer 41 and the alkyl fluoride content of this stream and consequently of the propane product is in the order 1000 to 1200 p.p.m. on the basis of fluorine. When the same system is operated according to the process of the invention, the fluoride content is reduced to about 70 to 120 p.p.m. as fluorine.

The temperatures and pressures of the distillation steps will be substantially the same when the process of the invention is practiced as those of the prior art process. The defluorinator 19 is operated at about 200 p.s.i., a bottom temperature of about 220° F., and a top temperature of about 135° F. Depropanizer 41 is operated at a pressure of about 285 p.s.i., a bottom temperature of about 230° F., and a top temperature of about 140° F. Stripper 51 is operated at a pressure of about 290 p.s.i., a bottom temperature of about 150° F., and a top temperature of about 143° F. A stripping gas ordinarily is not used.

The operation of a typical system such as shown in the drawing is reflected in the material balance of the following table wherein the materials in the numbered columns represent the materials at the locations of corresponding numbers on the drawing.

*Table*

| Stream | 17 | 42 | 22 | 39 | 54 | 25 | 35 | 43 | 21 |
|---|---|---|---|---|---|---|---|---|---|
| Component | Feed to Defluor. | Reflux to Defluor. | Total O.H. from Defluor. | Chg. to DC$_3$ | Propane Yield | Recycle HF | HF Yield | RCY iC$_4$ | Alky. to DiC$_4$ |
| Propane, b./h | 120 | 400 | 500 | 100 | 95 | | | 5 | 20 |
| i-Butane, b./h | 500 | 400 | 500 | 100 | 1 | | | 99 | 400 |
| n-Butane, b./h | 200 | 80 | 100 | 20 | | | | 20 | 180 |
| Total Alkylate, b./h | 80 | | | | | | | | 80 |
| Total Hydrocarbon, b./h | 900 | 880 | 1,100 | 220 | 96 | | | 124 | 680 |
| Soluble HF, #/hr | 1,800 | 2,640 | 3,300 | 660 | | | | | |
| Insoluble HF, #/hr | | | 1,140 | | | ² 660 | ² 1,800 | | |
| Organic Fluorides, p.p.m | 1,000 | 100 | ¹ 1,000 | 100 | 100 | | | 100 | 1,000 |

¹ Based on charge A.
² Liquid HF.

The material balance shows that the fluorides are reduced from 1000 p.p.m. to 100 p.p.m. The temperature in the accumulator 24 and in settler 29 is about 100° F. Intimate contacting of liquid HF and liquid hydrocarbon is enhanced by the mixture passing through pump 27 and through the extension 33 of conduit 28 into the body of liquid HF in settler 29. If a more complete removal of organic fluorides is desired, the temperature of the mixture can be raised in heater 31; however, an increase in temperature could result in a corrosion problem in settler 29. The settler could be lined with a corrosion resistant material such as polytetrafluoromethane since the settler is relatively small and simple as compared to the depropanizer. It will usually be more economical to consider the settler as being expendable if it is desirable or necessary to operate at elevated temperatures with resulting corrosion occurring. Corrosion is not a problem at about 100° F. and fluoride removal is satisfactory for all presently known uses of propane.

An important feature of the invention which is not obvious from the above table is that the capacity of the depropanizer is increased by eliminating the free liquid HF introduced into the depropanizer by the prior art proposed process. The vapor space occupied by HF vapor is 4 times that occupied by propane vapor and therefore each volume of liquid HF introduced into the depropanizer decreases the capacity of the depropanizer by 4 volumes of liquid propane. According to the process of the present invention no free liquid HF is introduced into the depropanizer and the capacity of the depropanizer is not impaired.

Variations and modifications are possible within the scope of the disclosure of the invention without departing from the spirit and scope of the invention.

That which is claimed is:

1. A process for treating hydrocarbon materials to remove therefrom organically combined fluorine comprising:
    (1) passing a hydrocarbon material saturated with HF and containing a minor quantity of organically combined fluorine to a distillation zone to produce a vaporized overhead product;
    (2) condensing the overhead product from the distillation zone to form a liquid having a hydrocarbon phase containing an alkylatable material and a HF phase;
    (3) admixing additional liquid HF with the liquid having the hydrocarbon phase and the HF phase;
    (4) separating the mixture of liquid hydrocarbon and liquid HF into a liquid hydrocarbon phase and a liquid HF phase; and
    (5) withdrawing liquid hydrocarbon having a reduced quantity of organically combined fluorine from the liquid hydrocarbon phase.

2. The process of claim 1 wherein said alkylatable material is isobutane.

3. In a hydrogen fluoride catalyzed reaction wherein organic compounds are treated with hydrogen fluoride in a reaction zone and an organic fluoride is formed as a by-product which is contained in the effluent from said reaction zone, the improvement comprising:
    (1) passing the effluent from said reaction zone to a first settler to form a liquid hydrocarbon phase and a liquid HF phase;
    (2) passing liquid hydrocarbon from the liquid hydrocarbon phase in said first settler to a first distillation zone to produce a vaporized overhead product;
    (3) condensing the overhead product from the first distillation zone to form a liquid having a hydrocarbon phase containing an alkylatable material and a HF phase;

(4) admixing additional liquid HF with the liquid having the hydrocarbon phase and the HF phase;
(5) passing the mixture to a second settler to separate the mixture into a liquid hydrocarbon phase containing dissolved HF and a liquid HF phase;
(6) passing liquid hydrocarbon containing dissolved HF from the liquid hydrocarbon phase in said second settler to a second distillation zone to produce a vaporized overhead product;
(7) condensing the overhead product from the second distillation zone to form a liquid having a hydrocarbon phase and a HF phase;
(8) separating the liquid formed by condensing the overhead product from the second distillation zone into a liquid hydrocarbon phase and a liquid HF phase;
(9) removing any dissolved HF from the liquid hydrocarbon phase; and
(10) passing liquid HF from the liquid HF phase into admixture with the liquid obtained by condensing the overhead product from the first distillation zone.

4. The process of claim 3 wherein said alkylatable material is isobutane.

5. The process of claim 3 wherein a portion of the liquid hydrocarbon in said second acid settler is passed as reflux to the first distillation zone.

6. In a process for the conversion of hydrocarbons in the presence of a hydrogen fluoride-containing catalyst wherein the reaction product is distilled in a distillation zone and the overhead product from the distillation zone contains an organic fluoride as an impurity, the improvement comprising the following sequential steps:
(1) condensing the overhead product from the distillation zone to form a condensate having a hydrocarbon phase containing an alkylatable material and a HF phase;
(2) admixing additional liquid HF with the condensate in an amount sufficient to maintain an excess of liquid HF over that required to saturate the condensate;
(3) passing the mixture to a settler to separate the mixture into a liquid hydrocarbon phase and a liquid HF phase such that the mixture enters the settler within the liquid HF phase; and
(4) removing liquid hydrocarbon having a reduced amount of an organic fluoride as an impurity from the liquid hydrocarbon phase of the settler.

7. The process of claim 6 wherein said alkylatable material is isobutane.

8. The process of claim 6 wherein isobutane is alkylated with butene in the presence of hydrogen fluoride.

9. In a system for the conversion of hydrocarbons in the presence of an HF-containing catalyst comprising in sequential, connected relationship a reactor, an acid settler connected to said reactor for receiving products from said reactor, said settler having a hydrocarbon zone and an acid zone, a first distillation column connected to the hydrocarbon zone of said acid settler, a cooler for condensing the overhead products from said first distillation column, an accumulator for storing the condensed overhead products, and a second distillation column, apparatus comprising:
(1) a second acid settler positioned between said accumulator and said second distillation column;
(2) a baffle positioned within said second acid settler, said baffle having an upper edge extending across said second acid settler to maintain a substantially constant zone of acid in the lower portion of said second acid settler;
(3) means positioned between said accumulator and said second acid settler for passing products with agitation from said accumulator to said second acid settler; and
(4) a conduit connecting said second acid settler to said second distillation column for passing hydrocarbon from said second acid settler to said second distillation column.

10. The apparatus of claim 9 wherein the means for passing the products from said accumulator to said second acid settler introduces the products at a point below the upper edge of said baffle.

11. The apparatus of claim 9 wherein means is provided for heating the products passing from said accumulator to said second acid settler.

References Cited by the Examiner

UNITED STATES PATENTS

| | | | |
|---|---|---|---|
| 2,448,092 | 8/48 | Gibson | 260—683.42 |
| 2,451,568 | 10/48 | Linn | 260—683.42 |
| 2,463,076 | 3/49 | Zimmerman et al. | 202—71 |
| 2,494,867 | 1/50 | Frey | 260—683.41 |
| 2,914,590 | 11/59 | Van Pool | 260—683.48 |

ALPHONSO D. SULLIVAN, *Primary Examiner.*